Oct. 11, 1938.                    O. WITTEL                    2,132,715
      GUIDE MEMBER FOR MOTION PICTURE APPARATUS OF THE MAGAZINE TYPE
                          Filed April 24, 1936
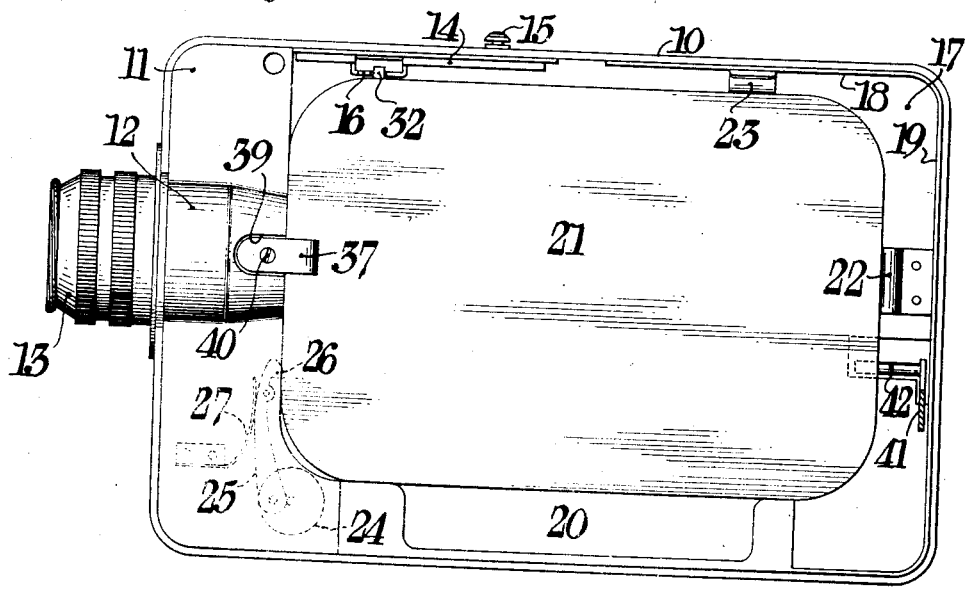
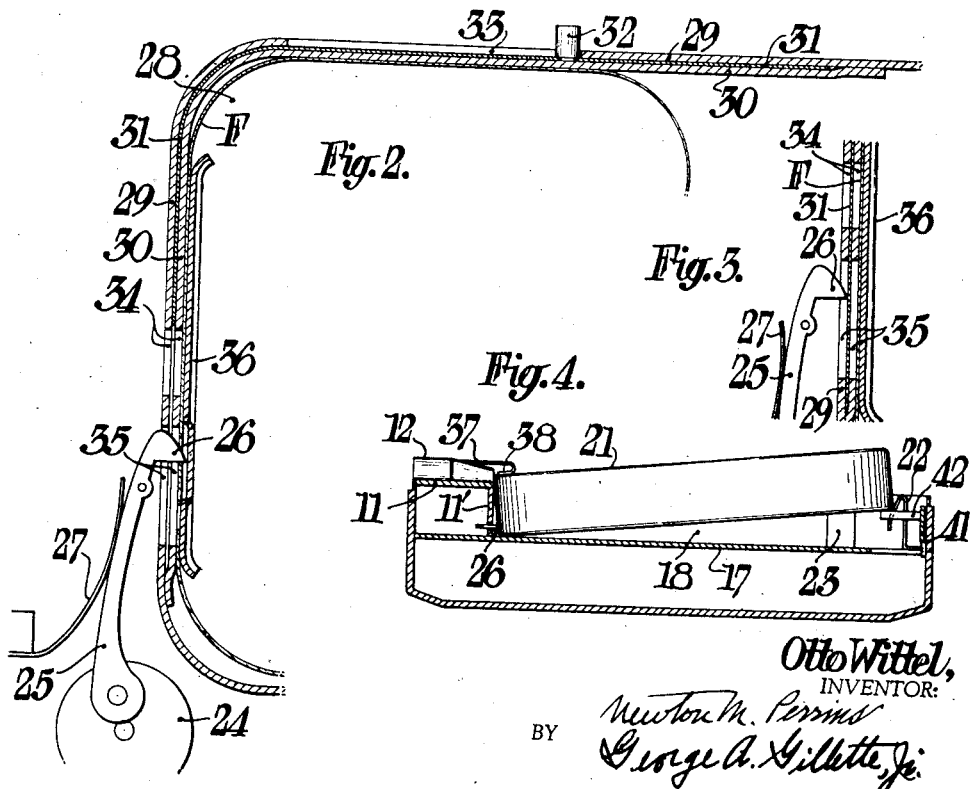
Otto Wittel,
INVENTOR:
BY Newton M. Perrins
George A. Gillette Jr.
ATTORNEYS.

Patented Oct. 11, 1938

2,132,715

UNITED STATES PATENT OFFICE 2,132,715

GUIDE MEMBER FOR MOTION PICTURE APPARATUS OF THE MAGAZINE TYPE

Otto Wittel, Rochester, N. Y., assignor, by mesne assignments, to Eastman Kodak Company, Jersey City, N. J., a corporation of New Jersey Application April 24, 1936, Serial No. 76,173
In Great Britain February 5, 1936

3 Claims. (Cl. 88—17)

The present invention relates to a guide member for motion picture apparatus of the magazine type and more particularly to a guide member which compels tilting of the film magazine during insertion into or removal from the magazine chamber of said apparatus. Such a guide member is disclosed but not claimed in my copending application, Serial No. 1372, filed January 11, 1935, for improvements in an Ejector for motion picture apparatus of the magazine type.

The primary object of the present invention is the provision of a guide member which extends into the magazine chamber of a motion picture apparatus and which lies over a portion of the film magazine to compel tilting of the magazine during insertion or removal thereof.

Another object of the invention is the provision of a guide member which has a resilient portion for engaging a surface of the film magazine for holding the magazine in position and at the same time for compelling tilting of the magazine for its insertion or removal. Other and further objects of the invention will be suggested to those skilled in the art by the disclosure which follows.

The above and other objects of the invention are obtained by merely providing a guide or spring member which extends into an open sided magazine chamber of a motion picture apparatus, said guide or spring member overlying or overlapping the film magazine to compel tilting thereof during removal or insertion and including the resilient portion for positioning the magazine after insertion.

Reference is hereby made to the accompanying drawing wherein similar reference characters designate similar elements and wherein:

Fig. 1 is a side elevation of a motion picture apparatus of the magazine type which is equipped with a guide member according to the invention.

Fig. 2 is a fragmentary view of the apparatus showing the film advancing mechanism and a cross section of the magazine wall.

Fig. 3 is a fragmentary section of the magazine wall showing the closure means for the magazine in closed position.

Fig. 4 is a longitudinal section through the apparatus showing the film magazine in tilted position.

The invention is to be described with respect to a motion picture camera but it is to be understood that the invention may also be used in connection with other kinds of motion picture apparatus of the magazine type, such as projectors, printers, etc.

The motion picture camera comprises a casing 10 which contains a cover plate 11 which has a raised portion 12 for receiving the inner end of the photographic objective 13. Said casing 10 also carries a latching bar 14 which can be operated by a button 15 on the exterior of casing 10 and which carries a saddle piece 16 for operating the closure means on the film magazine.

The magazine chamber is formed within said casing 10 and is enclosed by a side wall 17, by edge walls 18 and 19, by an edge wall 11', see Fig. 4, and by the support member 20. The film magazine 21 is located within said magazine chamber by a spring 22 which bears on the rear edge of magazine 21 to press the front of the magazine against the rear surface of front edge wall 11, while a second spring 23 bears upon the upper edge of film magazine 21 and presses the lower edge of the magazine against support member 20.

A film advancing mechanism is located within casing 10 and includes a driving eccentric 24, a claw arm 25 pivotally connected to said driving eccentric 24, a claw 26 and a spring member 27 for bearing on claw arm 25 and pressing claw 26 into the magazine chamber.

The film magazine, see Fig. 2, comprises a casing with a side wall 28 and an edge wall 29 extending around the edge of wall 28. An auxiliary wall 30 is attached to edge wall 28 and extends along the front and upper portions thereof, being spaced a slight distance from edge wall 29. A flexible shutter 31 is slidable between edge wall 29 and auxiliary wall 30, being operated by a pin 32 which extends through a slot 33 in the upper portion of edge wall 29 and which fits into the saddle piece 16 on the latching bar 14. The front portions of edge wall 29 and auxiliary wall 30 are each provided with exposure apertures 34 and claw openings 35, which apertures and openings may be covered by shutter 31 when it is moved to closed position. The film F is held in position across the inner aperture 34 and inner opening 35 by a presser member 36 of conventional design.

Even after shutter 31 has cammed the claw 26 of the film advancing mechanism out of engagement with the perforations of the film F, see Fig. 3, said claw 26 still overlies or overhangs the edge of the magazine edge wall 29. As a result it is not practical to remove the film magazine by direct lateral movement from the magazine chamber but the film magazine 21 should be tilted for removal or insertion in the manner illustrated in Fig. 4.

A guide member 37 extends into the magazine chamber and overlaps a portion of the film magazine 21. Said guide member 37 may include a spring portion 38 for resiliently engaging a portion of film magazine 21 to hold the side wall 28 of the magazine against the side wall 17 of the camera. Specifically member 37 may be set into a recess 39 provided in raised portion 12 of cover plate 11 by means of a bolt 40.

The initial movement of film magazine 21 for removal from the magazine chamber may be accomplished by an ejector mechanism including a brace 41 and a pin 42 both of which are fully disclosed in my aforementioned copending application, Serial No. 1,372, filed January 11, 1935. The provision of such ejector mechanism, however, is optional.

The film magazine 21 must have its forward edge inserted under the guide member 37 during insertion of the magazine and as a result the claw 26 of the film advancing mechanism will enter the claw opening 35 as the remainder of the film magazine is swung into proper position. Conversely, in order to remove the magazine the rear edge or portion of magazine 21 must be raised, either manually or automatically by the ejector mechanism indicated. Complete removal of film magazine 21 can only be accomplished by further tilting of the magazine and then withdrawing the same from the magazine chamber. Consequently, the film magazine 21 must be tilted either for insertion into or removal from the magazine chamber.

It should also be noted that the guide member 37 not only functions to compel the aforementioned tilting of the magazine but also aids in properly locating the film magazine within the camera by virtue of its resilient pressure against the forward portion of film magazine 21 over the edge wall 29 which is provided with the claw opening 35.

My invention herein described is susceptible of many variations and the present disclosure is to be construed in an illustrative sense, the scope of the invention being defined by the claims which follow.

Having now particularly described my invention, what I desire to secure by Letters Patent of the United States and what I claim is:

1. In a motion picture apparatus of the magazine type, the combination with a casing including a side wall and edge walls, which walls form a magazine chamber with an open side, and a film magazine having such dimensions as to substantially fill said magazine and such that said film magazine can be inserted into said chamber only through the open side thereof, of a guide member on said casing, extending into said magazine chamber, and having a portion for engaging and guiding said magazine during its insertion into said magazine chamber and for engaging and definitely positioning said magazine after such insertion into said chamber.

2. In a motion picture apparatus of the magazine type, the combination with a casing including a side wall and edge walls, which walls form a magazine chamber with an open side, and a film magazine having such dimensions as to substantially fill said magazine chamber and such that said film magazine can be inserted into said chamber only through the open side thereof, of a spring member on said casing for overlying and engaging a portion of said film magazine resiliently to maintain said magazine against the side wall of said chamber and for necessarily compelling tilting of said magazine during insertion into or removal from said magazine chamber.

3. In a motion picture apparatus of the magazine type, the combination with a casing including a side wall and edge walls, which walls form a magazine chamber open only at one side, a film magazine having such dimensions as to substantially fill said magazine chamber and such that said film magazine can be inserted into said chamber only through the open side thereof and having an edge wall which is provided with an opening, and a film advancing mechanism in said casing and including a claw for extending into the opening in said edge wall of the magazine, of a guide member extending into said magazine chamber for engaging said film magazine within said chamber and positioning therein the magazine edge wall which is provided with an opening, and for necessarily compelling tilting of said edge wall of said magazine during its insertion into or removal from said magazine chamber.

OTTO WITTEL.